United States Patent

Strid

[11] Patent Number: 6,102,212
[45] Date of Patent: Aug. 15, 2000

[54] FILTER ELEMENT

[75] Inventor: Kent Strid, Järbo, Sweden

[73] Assignee: Bandak AS, Lunde, Norway

[21] Appl. No.: 09/254,188

[22] PCT Filed: Sep. 8, 1997

[86] PCT No.: PCT/SE97/01507

§ 371 Date: Mar. 2, 1999

§ 102(e) Date: Mar. 2, 1999

[87] PCT Pub. No.: WO98/09704

PCT Pub. Date: Mar. 12, 1998

[30] Foreign Application Priority Data

Sep. 9, 1996 [SE] Sweden .................................. 9603269

[51] Int. Cl.⁷ ........................... B01D 29/17; B01D 29/19;
B01D 29/21; B01D 29/52; B01D 29/62
[52] U.S. Cl. ................ 210/411; 210/323.2; 210/333.01;
210/483; 210/488; 210/489; 210/492
[58] Field of Search ................................ 210/411, 323.2,
210/333.01, 483, 488, 489, 492, 484, 497.01

[56] References Cited

U.S. PATENT DOCUMENTS

| 2,562,735 | 7/1951 | Pick . |
| 2,742,158 | 4/1956 | Schuller . |
| 4,163,724 | 8/1979 | Muller et al. . |
| 4,213,861 | 7/1980 | Muller et al. . |
| 4,443,346 | 4/1984 | Muller . |
| 4,473,472 | 9/1984 | Muller et al. . |
| 4,604,201 | 8/1986 | Muller . |
| 5,435,911 | 7/1995 | Höhle . |

FOREIGN PATENT DOCUMENTS

| 0091064 | 10/1983 | European Pat. Off. . |
| 0155336 | 9/1985 | European Pat. Off. . |
| 658 405 | 11/1986 | Sweden . |
| 660851 | 5/1987 | Sweden . |
| 97/04850 | 2/1997 | WIPO . |

Primary Examiner—Thomas M. Lithgow
Attorney, Agent, or Firm—Birch, Stewart, Kolasch & Birch, LLP

[57] ABSTRACT

A filter element for a pressure filter where a substantially horizontal wall (3) divides the interior of a pressure vessel into a lower inlet compartment (5) and an upper outlet compartment (6). A filter element (20) having a filter medium (40) is suspended from the wall (3) such that the filtering takes place from the inlet compartment (5) through the filter element (20) up to the outlet compartment (6). A corrugated sheet (22) is provided which defines a plurality of substantially vertically extending channels (45) and (42). Each first channel (45) is open the inlet compartment (5) with the filter medium (40) covering the first channels (45) with the upper end of the first channels (45) being closed and the lower end of the first channels (45) being open at (43). The second channels (42) being formed on an inner side of the corrugated sheet (22) with an open bottom end and an upper end communicating with the outlet compartment (6).

6 Claims, 3 Drawing Sheets

FILTER ELEMENT

This application is the national phase under 35 U.S.C. §371 of prior PCT International Application No. PCT/SE97/01507 which has an International filing date of Sep. 8, 1997 which designated the United States of America.

BACKGROUND OF THE INVENTION

1. Field of the Invention

The present invention concerns a filter element for a pressure filter of the kind where a substantially horizontal wall in a fluid tight manner separates the interior of a pressure vessel in a lower inlet compartment and an upper outlet compartment, and where at least one filter element having a filter medium is suspended from the wall such that filtering takes place from the inlet compartment up through the filter element to the outlet compartment.

2. Description of Background Art

One type of such filter including a plurality of filter elements depending from the horizontal plate and having shapes of perforated tubes covered with filter cloth is commonly referred to as a CLARIFIL filter and is used in recausticizing plants in the pulp and paper industry for liquor clarifying. From time to time each filter element must be backwashed in order to remove solids deposited on the filter cloth. Backwash takes places by causing a backwash liquid to flow from the outlet compartment, down through the filter element and into the inlet compartment flushing solids off the filter cloth. Typical for filters of the CLARIFIL-type is that filtrate, i.e., clarified liquor, is used as a backwash liquid. This, of course, involves a loss of filtrate, since the backwash filtrate dilutes the solids deposited on the filter cloth and accompanies them to a solids outlet. It is desirable, thus, to perform backwash in a CLARIFIL-type filter with another liquid than filtrate, preferably water, to achieve a higher degree of separation.

Other types of filters use a liquid other than filtrate, normally water, to perform backwash. In such filters, the filter elements are emptied from filtrate before backwash is performed, typically by blowing air through the filter elements, thus displacing filtrate contained within the filter elements. It is a desire to convert a CLARIFIL-type filter such that backwash with water would be possible, but a CLARIFIL-type filter cannot be emptied from filtrate by displacing filtrate upwards in the way described.

A measure of the effectiveness of a filter element is the degree of perforation, i.e., the ratio between the sum of the areas of all perforations and the entire area of a filter tube. In a CLARIFIL-type filter the degree of perforation is typically not above 30%, i.e., the open area under a filter cloth available for filtration is reduced to 30%.

Another measure to is the ratio between filter area (A) and interior volume (V) of a filter element. For a typical filter tube of a CLARIFIL-type filter element having an outer diameter of 60 mm, the relation A/V is about 6.

Further, in a CLARIFIL-type filter there is a tendency that the filter cake obtains a conical shape, i.e., that more solids are deposited close to the upper end of a filter tube than close to the free end of the tube. This may result in that solids deposited on adjacent tubes merge into a hard solid block that is impossible to remove by ordinary backwash, but necessitates disassembling of the filter for mechanical removal of the block of solids.

SUMMARY AND OBJECTS OF THE INVENTION

The present invention has as one of its objects to provide a filter element that may be emptied from filtrate in an upward direction. Other objects are to provide a filter element, that has a high degree of perforation and a high area/volume ratio.

In achieving the first mentioned object the present invention is based on the knowledge that a column of liquid contained in a vertical channel can be displaced in an upward direction by means of air introduced at the bottom of the channel only when the cross section of the channel is relatively small.

BRIEF DESCRIPTION OF THE DRAWINGS

An embodiment of a filter element according to the present invention will now be described, reference being made to the accompanying drawings, wherein.

DETAILED DESCRIPTION OF THE PREFERRED EMBODIMENT

Figure 1:
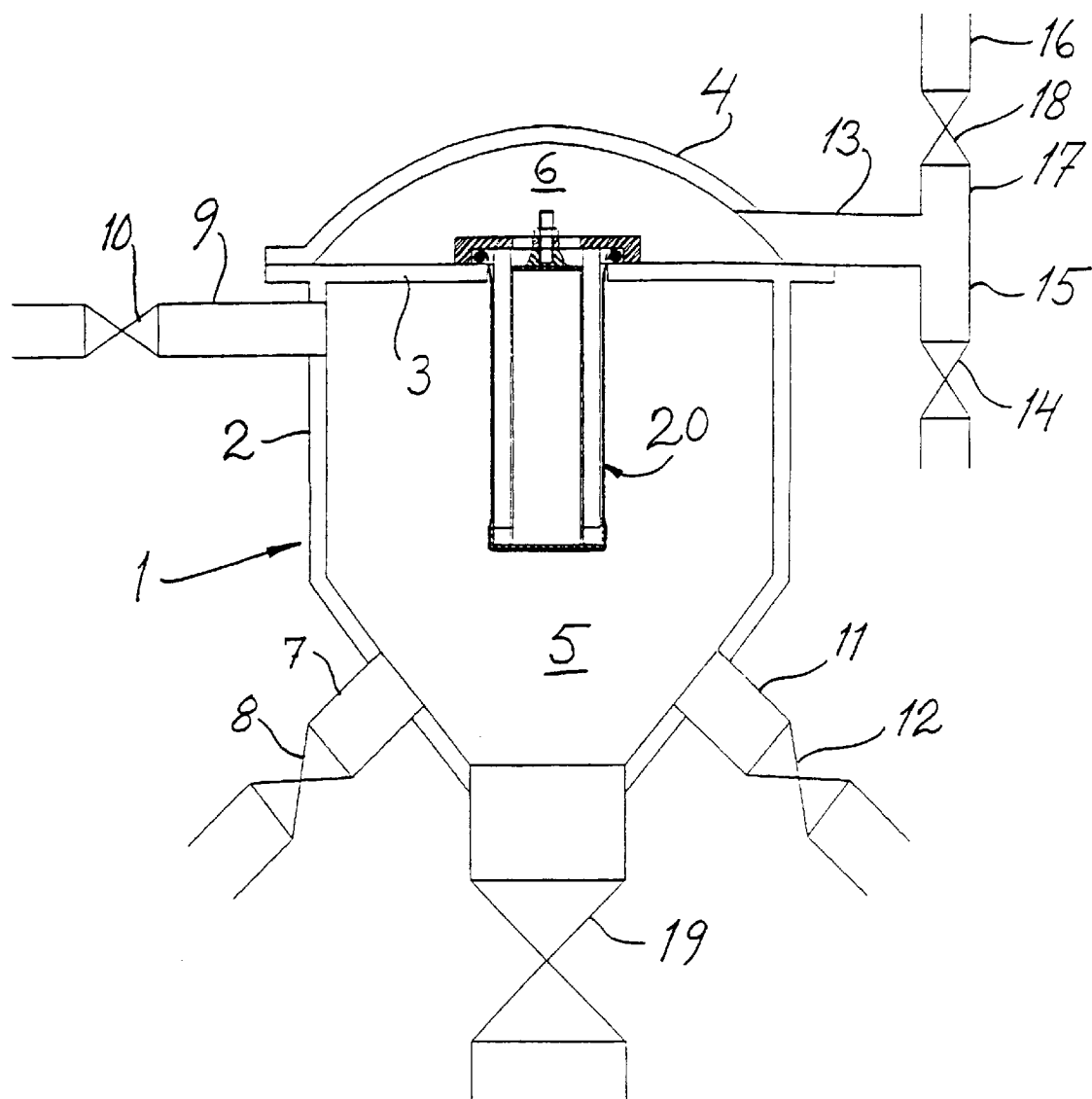
FIG. 1 is a schematic view showing a pressure filter equipped with one filter element.

In FIG. 1 is shown a pressure vessel 1 having an envelope wall 2 and having in its upper end a horizontal wall 3. A cover 4 is mounted over the upper end of the vessel 1. The interior of the vessel 1 constitutes an inlet compartment 5 and the interior of the cover 4 constitutes an outlet compartment 6, these compartments being tightly separated by the wall 3. An inlet conduit 7 for a liquid to be filtered is connected to the envelope wall 2 to direct said fluid into the interior of the inlet compartment 5. A valve 8 is mounted in the conduit 7. An air inlet conduit 9 is connected to the wall 2 at a relatively high level and has an air inlet valve 10. A drainage conduit 11 also connected to the wall 2 has a drainage valve 12.

The cover 4 has connected thereto a conduit 13 serving on one hand as an outlet for filtrate from the outlet compartment 6 to a non-shown tank, and on the other hand as inlet for backwash liquid. A filtrate outlet valve 14 is mounted in a downwardly directed branch 15 of the conduit 13, and a backwash liquid inlet conduit 16 is connected to another branch 17 of the conduit 9 by means of a backwash liquid inlet valve 18. In the bottom region of the vessel 1 there is an outlet valve 19 for solids.

A filter element 20 is attached in its upper end to the wall 3. The filter element includes a filter medium such as a filter cloth, and is adapted to filter solid particles from a liquid introduced through the conduit 7 into the inlet compartment 5, and to direct filtrate obtained in an upward direction interiorly of the filter cloth into the outlet compartment 6. From the outlet compartment the filtrate is discharged through the conduit 13.

As now described, the pressure filter of FIG. 1 in all essential corresponds to a conventional filter of the CLARIFIL-type, although, in practice, a plurality of filter elements 20 would be employed.

However, instead of employing a perforated tube covered with filter cloth as does the CLARIFIL-type filter, the present invention provides a new filter element, the principle of which resides in that the interior volume of the filter element, i.e., the volume inside the filter cloth, or, rather the cross section of the interior of the filter element available for filtrate transportation in an upward direction, is divided in a plurality of relatively small cross section channels.

Figure 2:
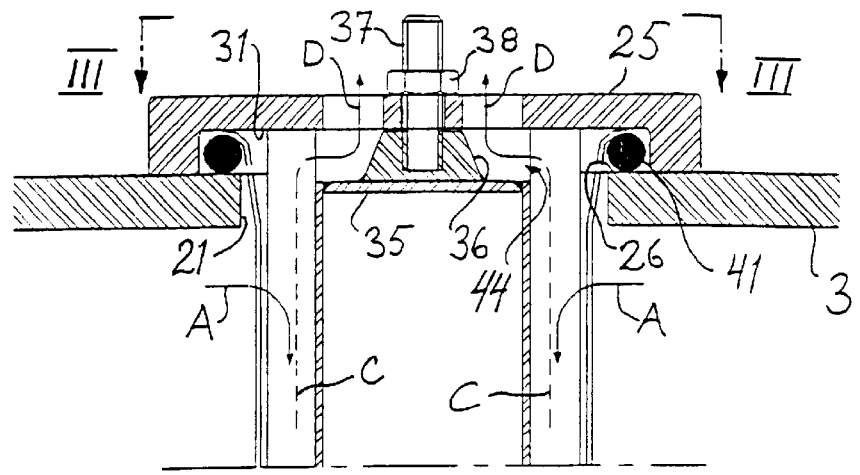
FIG. 2 is a section through a filter element showing its filtering condition.
Figure 2:
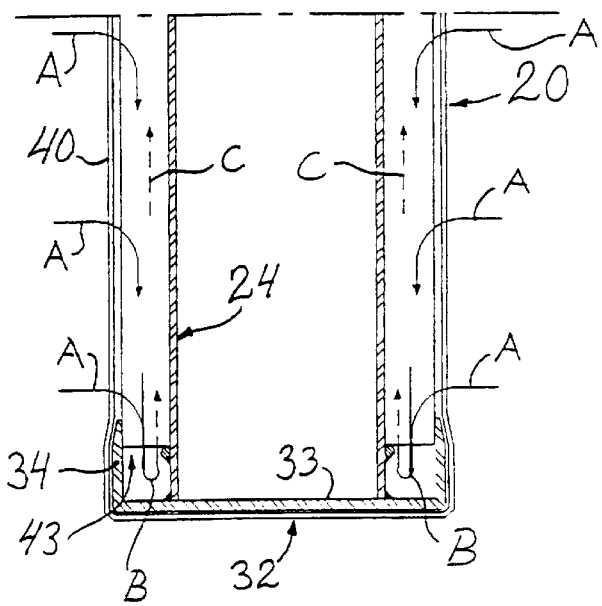
Figure 3:
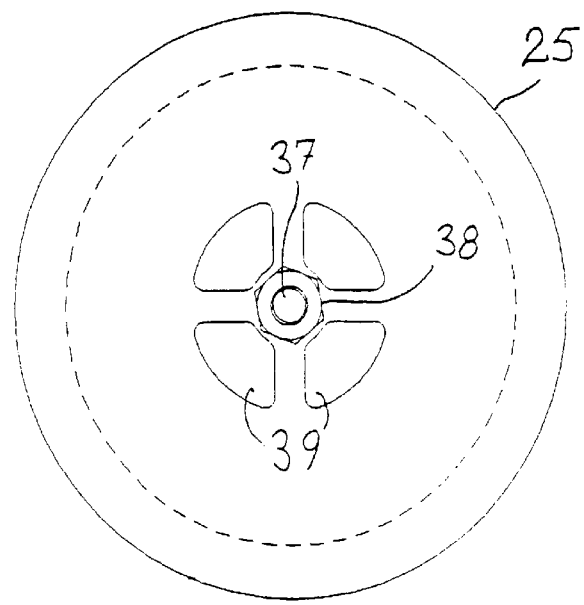
FIG. 3 is a view along line III—III in FIG. 2.
Figure 4:
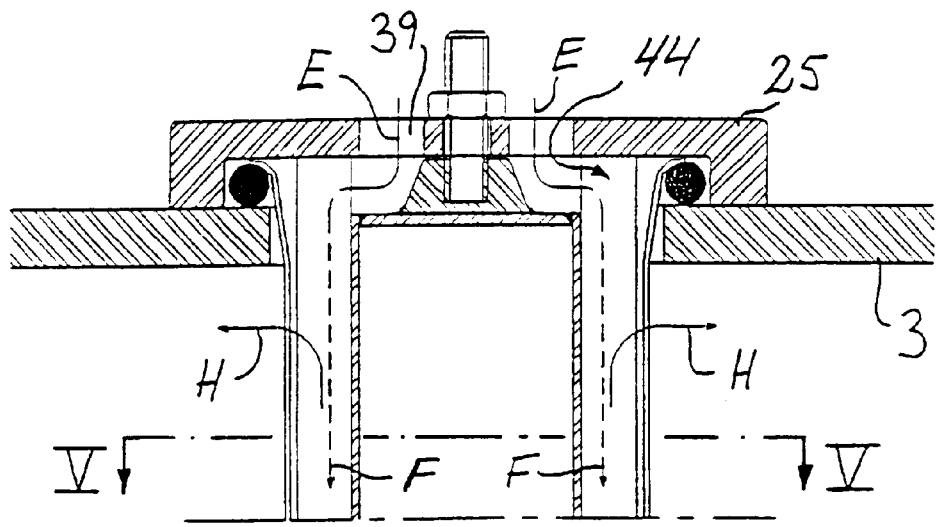
FIG. 4 is a section through a filter element showing its backwash condition.
Figure 4:
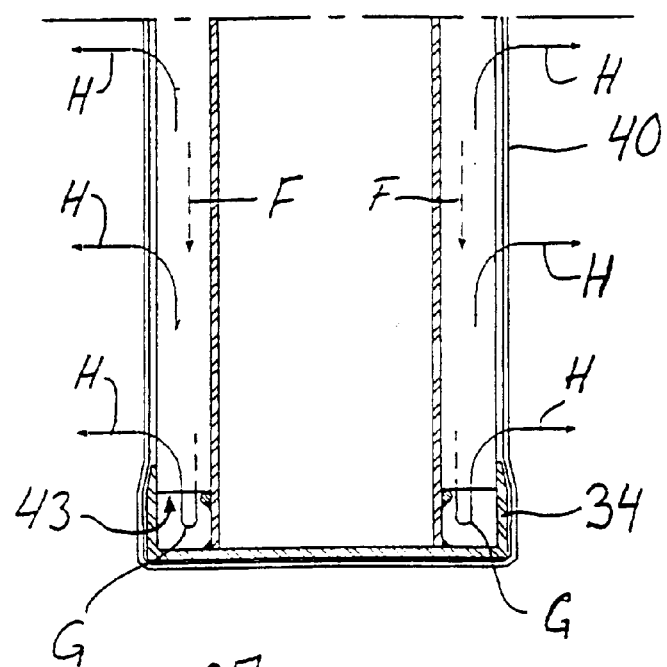

An embodiment of such a filter element 20 is shown in FIGS. 2–5. In FIGS. 2 and 4, reference numeral 3 denotes the horizontal partition wall of FIG. 1. The filter element 20 is mounted in a circular hole 21 i the wall 3. A cylindrical body 22 formed from an originally rectangular plate or sheet of any suitable, fluid tight material, such as metal or a synthetic material, and having corrugations or folds 23 (see FIG. 5), is arranged around a likewise cylindrical support or core structure 24 depending from a plate-shaped carrier plate 25 bearing on an inwardly directed flange 26 of the hole 21.

The corrugations 23 of the body 22 has outwardly facing folds or ridges 27, inwardly facing folds or ridges 28, and sides 29, the inwardly facing ridges 28 fluid tightly abutting the outer circumferential surface 30 of the support structure 24. As appears from FIGS. 2 and 4, the upper end of the body 22 abuts a recessed portion 31 of the carrier plate 25, whereas the lower end of the body 22 terminates at a higher level than does the support structure 24. A bowl or cup shaped body 32 having a bottom 33 and a cylindrical side wall 34 is tightly attached to the bottom end of the support structure 24, the side wall 34 of the body 32 extending upwardly to a level slightly above the lower end of the body 22. The upper end of the support structure 24 has an end wall 35 provided with a hub-like projection 36 having a threaded hole therein receiving one end of a bolt 37. The other end of the bolt is introduced through a central hole in the carrier 25, and a nut 38 secures the entire filter element 20 to the carrier plate 25.

The height of the projection 36 is such that the upper end wall 35 is spaced from the recessed portion 31 of the carrier plate 25. The carrier plate has formed therein openings 39 (see FIG. 3) so as to establish communication between the lower and upper sides of the wall 3, i.e., the inlet compartment 5 and the outlet compartment 6.

A filter medium, preferably a filter cloth 40 shaped into a suitable bag shape, is surrounding the body 22 and the cup shaped body 32 and is secured at its upper end by means of a resilient sealing ring 41 pressed between the flange 26 of the opening 21 and the recessed portion 31 of the carrier plate 25. Along its entire effective height, the filter cloth 40 bears on the outwardly facing ridges 27 of the body 22. This results in a degree of perforation of about 95%.

Non-shown means, such as a clamping plate, may be used to secure the filter element 20, or, several filter elements 20, to the wall 3 by exerting a downwardly directed force against the carrier plate 25.

The corrugations 23 of the body 22 form a plurality of vertically extending, closed inner channels 42, each defined by two adjacent sides 29 of the corrugations 23 and a portion of the circumferential wall 30 of the support structure 24 between two adjacent inwardly facing ridges 28. Each such channel has a downwardly facing lower opening 43 located between the side wall 34 of the cup shaped body 32 and the lower portion of the support structure 24, and a radially inwardly facing upper opening 44.

The corrugations 23 also form a plurality of vertically extending, radially outwardly open, outer channels 45, each defined by two adjacent sides 29 of the corrugations 23, these channels being covered by the filter cloth 40.

The function of a filter element according to the present invention is the following: The valves 8 and 14 are opened and a liquid to be filtered is introduced through the conduit 7 into the inlet compartment 5 and is allowed to fill that compartment displacing air through the filter element 20 into the outlet compartment 6 and out through the conduit 15. As soon as the entire inlet compartment is filled with the liquid, the pressure differential between the inlet compartment and the outlet compartment (generally atmospheric pressure in the latter) will force the liquid through the filter cloth 40 covering the channels 45. Since these channels are closed upwardly by abutment between the body 22 and the recessed portion 31 of the carrier plate 25, the filtrate entering these channels will be forced downwardly (arrows A) towards the lower end of the channels which is open due to the space existing between the lower end of the body 22 and the bottom wall 33 of the cup shaped body 32. At the lower end of the body 22, the filtrate will turn upwards (arrows B) through the open ends 43 into the inner channels 42 and will continue upwards (broken line arrows C) in these channels (hidden in FIG. 2) towards the top of the filter element. At the upper end of the channels 42, the filtrate will turn radially inwards through the openings 44 and then upwards through the openings 39 (arrows D) into the outlet compartment 6, and finally through the downwardly directed branch 15 of the conduit 13 and the open valve 14 into the non-shown filtrate tank.

When time comes to interrupt the filtration procedure and to remove the filter cake deposited on the filter cloth, the valve 8 is closed, and the valve 10 is opened to introduce pressurized air through the conduit 9 into the inlet compartment 5. At the same time, the valve 12 is opened to drain the inlet compartment from liquid through the conduit 11. From the moment the level in the inlet compartment has dropped to the level of the upper edge of the side wall 34 of the cup shaped body 32, no more filtrate will be produced through the filter element. Instead, after the valve 12 has been closed, air will be forced through the filter cake deposited on the filter cloth 40 and through the filter cloth, thereby drying the filter cake and displacing filtrate remaining within the inner channels 42 upwards towards the outlet compartment 6.

When the filter cake has obtained a desired degree of dryness, the valves 10 and 14 are closed, and the valves 18 and 19 are opened. Backwash water is introduced from the conduit 16 and the branch 17 of conduit 13 into the outlet compartment 6 and from there through the openings 39 (see FIG. 5) into the inner channels 42 (arrows E) of the filter element. The water flows downwards (broken line arrows F) and at the bottom of the channels it turns upwards (arrow G) into the outer channels 45 and distributes itself along the channels which it leaves through the filter cloth 40 (arrows H), thereby removing filter cake from the filter cloth. The filter cake and water fall down to the bottom of the inlet compartment and are discharged through the open valve 19.

The function of displacing filtrate upwards is possible due to the relatively small cross section of each channel 42. Typical measures of a body 22 are: Outer diameter 80 mm (between outer ridges 27), inner diameter 60 mm (between inner ridges 28), circumferential distance between adjacent outer ridges 27 10 mm, and material thickness 0,3 mm.

In a filter element having these measures, the area/volume ratio is about 11, i.e. about twice the value of a conventional tube filter. This value is calculated with the interior volume being the sum of the volumes of the inner channels 42 and the outer channels 45. However, a more correct value (almost a doubling) would result from calculating with only the volume of the inner channels 42, since in fact this volume is what has to be displaced upwards when emptying the filter element.

The support structure 24 is shown here to be cylindrical. Other cross sectional shapes are possible, such as rectangular, although the circular cross section is preferred due to its superior capacity to withstand pressure.

Figure 5:
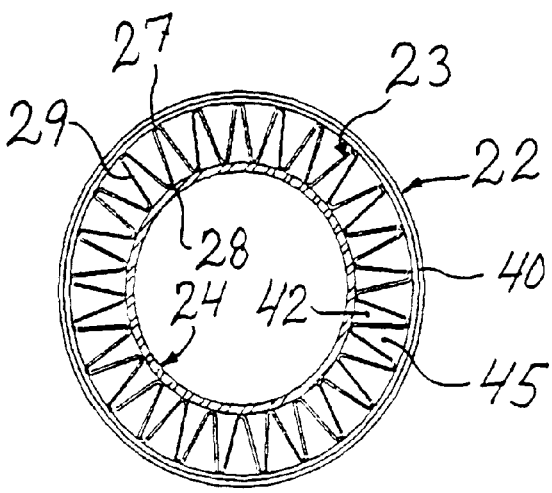
FIG. 5 is a section taken along line V—V in FIG. 4.

The circular shape is also preferred because when forming the body 22 from a corrugated sheet, the inner channels 42 obtain a smaller cross section than do the outer channels 45, as seen in FIG. 5. This has the advantage that a relatively small volume of filtrate has to be displaced up through the channels 42 when emptying the filter element before backwashing. On the other hand, when backwash liquid coming from the relatively narrow channels 42 enters the relatively wide channels 45 (arrows G), its flow rate is reduced leading to a corresponding reduction in the impingement shock between backwash liquid and the filter cloth 40.

What is claimed is:

1. A filter element for a pressure filter having a substantially horizontal wall (3) in a fluid tight manner divides the interior of a pressure vessel into a lower inlet compartment (5) and an upper outlet compartment (6), and where at least one filter element (20) having a filter medium (40) is suspended from the wall (3) such that filtering takes place from the inlet compartment (5) through the filter element (20) up to the outlet compartment (6), said filter element including substantially vertically extending first and second channel means, said first channel means (45) communicating with said inlet compartment (5) through said filter medium (40) and having an upper closed end and a lower open end, and said second channel means (42) having a lower open end (43) and an upper end (44) open to the outlet compartment (6), characterized by a corrugated sheet (22) formed around a core structure (24), the corrugated sheet having first ridges (27) facing from the core structure (24), second ridges (28) facing and abutting the core structure, and sides (29) therebetween; two sides (29), one second ridge (28) therebetween, and two adjacent first ridges (27) defining each of a plurality of vertically extending first channels (45) facing the inlet compartment (5) and being covered by the filter medium bearing on said first ridges (27); and two sides (29), one first ridge (27) therebetween, and a portion of a surface of the core structure between two adjacent second ridges (28) defining each second channel (42).

2. A filter element according to claim 1, characterized by means (32) at a lower end of the corrugated sheet (22) defining a space communicating (arrows B, G) with each of the first (45) and the second channels (42).

3. A filter element according to claim 1, characterized in that the core structure (24) has the shape of a straight circular cylinder.

4. A filter element according to claim 3, characterized in that the core structure is tubular.

5. A filter element according to claim 1, characterized in that the core structure (24) is adapted to be suspended from the substantially horizontal wall (3) and to carry the corrugated sheet (22) in a fluid tight relationship.

6. A filter element according to claim 1, characterized in that the core structure is a straight circular cylinder (24) adapted to be suspended from the horizontal wall (3), that the corrugated sheet (22) is formed into a tubular shape and arranged around the cylinder such that its second ridges (28) abut the cylinder in a fluid tight manner, that a cup shaped body (32) is arranged about the lower end of the cylinder (24) and the corrugated sheet (22) such that a circumferential wall (34) thereof tightly abuts the first ridges (27) and such that a space is formed below the lower ends of the channels, and that the corrugated sheet (22) extends upwardly beyond an upper end of the cylinder (24) such that the upper ends of the second channels (42) are open in a radially inward direction towards a space above the upper end of the cylinder communicating with the outlet compartment (6).

* * * * *